United States Patent [19]
Bloom

[11] Patent Number: 6,074,101
[45] Date of Patent: Jun. 13, 2000

[54] APPARATUS FOR, AND METHOD OF, FORMING A LOW STRESS TIGHT FIT OF AN OPTICAL FIBER TO AN EXTERNAL ELEMENT

[76] Inventor: Cary Bloom, 5272 River Rd., Bethesda, Md. 20816

[21] Appl. No.: 09/233,180

[22] Filed: Jan. 20, 1999

Related U.S. Application Data

[63] Continuation of application No. 08/885,034, Jun. 30, 1997, Pat. No. 5,917,975, which is a continuation-in-part of application No. 08/763,125, Dec. 10, 1996, Pat. No. 5,815,619, which is a continuation-in-part of application No. 08/763, 122, Dec. 10, 1996, Pat. No. 5,871,559, which is a continuation-in-part of application No. 08/866,385, May 30, 1997, Pat. No. 5,971,629, and a continuation-in-part of application No. 08/880,037, Jun. 20, 1997, Pat. No. 5,959,296

[60] Provisional application No. 60/040,875, Mar. 21, 1997.

[51] Int. Cl.[7] .................................................. G02B 6/36
[52] U.S. Cl. .............................. 385/78; 385/76; 385/60; 385/72
[58] Field of Search ................................ 385/60, 72, 76, 385/78, 80, 138, 139

[56] References Cited

U.S. PATENT DOCUMENTS

| | | |
|---|---|---|
| Re. 33,296 | 8/1990 | Stowe et al. . |
| Re. 34,955 | 5/1995 | Anton et al. . |
| 3,854,003 | 12/1974 | Duret . |
| 4,026,632 | 5/1977 | Hill et al. . |
| 4,611,894 | 9/1986 | Roberts . |
| 4,699,453 | 10/1987 | Roberts . |
| 4,701,010 | 10/1987 | Roberts . |
| 4,707,065 | 11/1987 | Jenkins . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |

(List continued on next page.)

FOREIGN PATENT DOCUMENTS

| | | |
|---|---|---|
| 58216216 | 12/1983 | European Pat. Off. . |
| 0 104 513 | 4/1984 | European Pat. Off. . |
| 0293289 | 5/1988 | European Pat. Off. . |
| 0 285 784 | 10/1988 | European Pat. Off. . |
| 0 628 840 | 12/1994 | European Pat. Off. . |
| 2235043A | 8/1990 | United Kingdom . |
| WO87/00934 | 7/1986 | WIPO . |
| 0215668A2 | 9/1986 | WIPO . |
| WO 86/05596 | 9/1986 | WIPO . |
| WO 93/13442 | 7/1993 | WIPO . |
| WO 96/37794 | 11/1996 | WIPO . |

OTHER PUBLICATIONS

"Automated Fabrication of Fused Fibre Optic Couplers", Swain, R., M. Phil. dissertation, Heriot–Watt University, Edinburgh, Ireland (1993). No Month.

"Tapered Optical Fiber Components and Sensors", by L.C. Bobb, et al., Microwave journal, May 1992.

"The Shape of Fiber Tapers", by T.A. Birks et al., Journal of Lightwave Technology, IEEE, vol. 10, No. 4, Apr. 1992, pp. 432–438.

"Mass Production of Fused Couplers and Coupler Based Devices", by W.E. Moore et al. No Date.

"Loss and Spectral Control in Fused Tapered Couplers", by K.P. Oakley et al., Optical Engineering, vol. 33, No. 12, Dec. 1994, pp. 4006–4019.

"Control of Optical Fibre Taper Shape", Electronics Letters, vol. 27, No. 18, Aug. 29, 1991.

(List continued on next page.)

*Primary Examiner*—Phan T. H. Palmer
*Attorney, Agent, or Firm*—Irah H. Donner; Pepper Hamilton LLP

[57] ABSTRACT

An apparatus includes at least one optical fiber, device and fiber optic device with a region, and a ferrule with a connection area or aperture. At least one of the region is expanded, and the aperture is contracted, for substantial securing of the region to the aperture of the ferrule.

20 Claims, 8 Drawing Sheets

U.S. PATENT DOCUMENTS

| | | |
|---|---|---|
| 4,834,481 | 5/1989 | Lawson et al. . |
| 4,895,423 | 1/1990 | Bilodeau et al. . |
| 4,900,119 | 2/1990 | Hill et al. . |
| 4,906,068 | 3/1990 | Olson et al. . |
| 4,923,273 | 5/1990 | Taylor . |
| 4,957,338 | 9/1990 | Thorncraft et al. . |
| 4,995,688 | 2/1991 | Anton et al. . |
| 4,997,243 | 3/1991 | Aiki et al. . |
| 4,997,245 | 3/1991 | DuPuy et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,157,751 | 10/1992 | Maas et al. . |
| 5,159,655 | 10/1992 | Ziebol . |
| 5,166,992 | 11/1992 | Cassidy et al. . |
| 5,166,994 | 11/1992 | Stowe et al. . |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,214,732 | 5/1993 | Beard et al. . |
| 5,214,735 | 5/1993 | Henneberger et al. . |
| 5,216,736 | 6/1993 | Essert . |
| 5,222,176 | 6/1993 | Webber et al. . |
| 5,239,604 | 8/1993 | Ziebol et al. . |
| 5,251,002 | 10/1993 | Gryk . |
| 5,261,019 | 11/1993 | Beard et al. . |
| 5,274,731 | 12/1993 | White . |
| 5,283,852 | 2/1994 | Gibler et al. . |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,319,728 | 6/1994 | Lu et al. . |
| 5,319,733 | 6/1994 | Emmons et al. . |
| 5,329,600 | 7/1994 | Sasaoka et al. . |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,422,969 | 6/1995 | Eno . |
| 5,432,854 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,475,780 | 12/1995 | Mizrahi . |
| 5,475,782 | 12/1995 | Ziebol . |
| 5,475,784 | 12/1995 | Bookbinder et al. . |
| 5,497,444 | 3/1996 | Wheeler . |
| 5,577,149 | 11/1996 | Averbeck et al. . |
| 5,588,087 | 12/1996 | Emmons et al. . |
| 5,602,952 | 2/1997 | Rashleigh et al. . |
| 5,917,975 | 6/1999 | Bloom ........................................ 385/78 |

OTHER PUBLICATIONS

"Fiber–Coupler Fabrication with Automatic Fusion–elongation Processes for Low Excess Loss and High Coupling–Ratio Accuracy", by I. Yokohama, et al., Journal of Lightwave Technology, IEEE, vol. LT–5, No. 7, Jul. 1987.

Intel Packaging Data Book, chapter 3, IC Assembly Technology, 1995, pp. 3–26—3–32. No Month.

Fibre–optic Coupler Fabrication at AOFR, by A.J. Stevenson et al., International Journal of Optoelectronics, vol. 6, Nos. 1/2, 1991, pp. 127–144. No Month.

"From Your space . . . to outer space", Fibre Bragg Gratings, 3M Innovation, Circle No. 76. 1996. (no month).

"100ips & 2 microns", Anorad linear motor gantries, Anorad Corporation, Circle 7. No Date.

"1μm, 2g, 3m/s", Anorad LW linear motor stages, Anorad Corporation, Circle 7.

"The New Standard for Case Erecting and Sealing", ABC Packaging Machine Corporation, Circle 22. No date.

"All Product Brochure" Schleuniger, Inc., pp. 1–12. No date.

"Schleuniger US 2545 Stripping Machine", Schleuniger, Inc. No. Date.

"Schleuniger FO 7010 Kelvar Cutting Machine", Schleuniger, Inc. No Date.

"Schleuniger PF 1000/PF 2000 Electric Demand Prefeeders", Schleuniger, Inc. No Date.

"CP 1200 Coiling Unit", Schleuniger, Inc. No. Date.

"Schleuniger WS 1500/CP 1250 Wire Stacker/Coiling Pan", Schleuniger, Inc. No. Date.

"Premise Wiring Communication Fiber Optics", Fiber Instrument Sales Inc., 15th Edition, 1997, pp. 1–68. No Month.

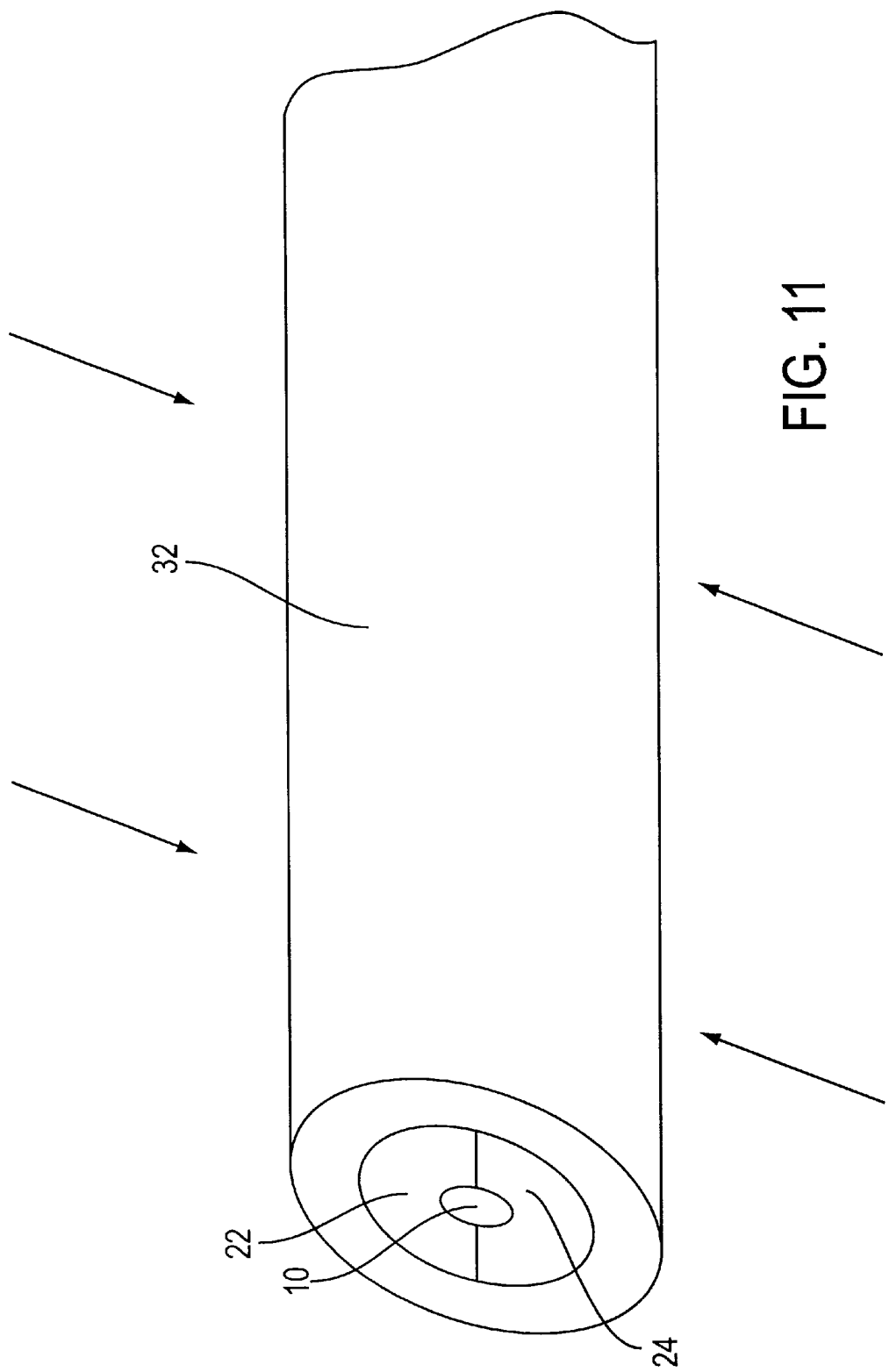

APPARATUS FOR, AND METHOD OF, FORMING A LOW STRESS TIGHT FIT OF AN OPTICAL FIBER TO AN EXTERNAL ELEMENT

RELATED APPLICATIONS

This application is a continuation application of U.S. application Ser. No. 08/885,034 filed Jun. 30, 1997 now U.S. Pat. No. 5,917,975, which is incorporated herein by reference.

This application claims priority from U.S. provisional application 60/040,875, filed on Mar. 21, 1997, entitled "Methods, Devices and Articles of Manufacture for Optical Fibers and Optical Fiber Systems", incorporated herein by reference. This application is a continuation-in-part application of U.S. application Ser. No. 08/763,125, filed on Dec. 10, 1996 now U.S. Pat. No. 5,815,619, a continuation-in-part application of U.S. application Ser. No. 08/763,122, filed on Dec. 10, 1996 now U.S. Pat. No. 5,871,559, a continuation-in-part application of U.S. application Ser. No. 08/866,385, entitled "APPARATUS AND METHOD BONDING OPTICAL FIBER AND/OR DEVICE TO EXTERNAL ELEMENT USING COMPLIANT MATERIAL INTERFACE" to the same applicant, filed on May 30, 1997 (attorney docket 2986-005A) now U.S. Pat. No. 5,971,629, and a continuation-in-part application of U.S. application Ser. No. 08/880,037, entitled "APPARATUS FOR, AND METHOD OF, FORMING A LOW STRESS TIGHT FIT OF AN OPTICAL FIBER TO AN EXTERNAL ELEMENT" to the same applicant, filed on Jun. 20, 1997 (attorney docket 2986-004A) now U.S. Pat. No. 5,959,296, all of which are incorporated herein by reference.

BACKGROUND OF THE INVENTION

1. Field of the Invention

The present invention relates to an apparatus for, and method of, forming a low stress tight fit of an optical fiber to an external element, and more particularly, to an apparatus for, and method of, accurately and reliably forming a low stress tight fit of an optical fiber to a ferrule.

2. Background of the Related Art

Currently, various techniques exist for stabilizing an optical fiber and/or device to an external substrate or connector system, such as a ferrule. For example, one technique involves using an epoxy to affix the optical fiber to an external substrate or in a hole within a ferrule. See, for example, U.S. Pat. Nos. 5,381,497, 5,293,582 and 5,261,019.

Another technique disclosed in U.S. Pat. No. 5,475,784 to Bookbinder, et al. encapsulates a segment of organic material of an optical component, such as a junction, by directly placing molten metal around the component and solidifying the metal.

U.S. Patent to Ziebol et al. relates to a connector including a crimp, a ferrule holder and ferrule. The fiber is physically retained by the crimp and free floating within ferrule. The crimp is the only element of the connector having a grasping contact on the fiber.

However, the resulting secured optical fiber according to these prior techniques often times is not properly secured to the external substrate, and/or element, and/or ferrule. These processes are difficult to automate, and do not provide good yield results. For example, the use of epoxy makes the manufacturing process difficult. Similarly, the use of a crimping action can damage the ferrule and/or optical fiber.

It is therefore desirable to provide accurate and consistent production of optical fibers that are secured to an external substrate, element and/or ferrule, for strength, support, and/or protection.

It is also desirable to provide production techniques to secure optical fibers to an external substrate, element and/or ferrule.

It is also desirable to provide a procedure that allows a connector to be attached or secured to an optical fiber, ferrule, substrate and/or element, quickly, reliably, and inexpensively.

It is also desirable to provide a procedure to automate the attachment of connectors to optical fibers by field personnel.

It is also desirable to provide a procedure to automatically produce fiber optic patch cords and pigtails.

SUMMARY OF THE INVENTION

It is a feature and advantage of the present invention to provide accurate and consistent production of optical fibers that are secured to an external substrate, element and/or ferrule, for strength, support, and protection.

It is a feature and advantage of the present invention to provide production techniques to secure optical fibers to an external substrate, element and/or ferrule.

It is a feature and advantage of the present invention to provide a procedure that allows a connector to be attached or secured to an optical fiber, ferrule, substrate and/or element, quickly, reliably, and inexpensively.

It is a feature and advantage of the present invention to provide a procedure to automate the attachment of connectors to optical fibers by field personnel.

It is a feature and advantage of the present invention to provide a procedure to automatically produce fiber optic patch cords and pigtails.

The present invention accurately and reliably secures an optical fiber (or other device, optical fiber device having similar requirements) with an external substrate and/or element, such as a ferrule. The present invention may be used, for example, to attach connectors to the ends of optical fibers.

The present invention is based, in part, on the discovery or identification of the problem that during the standard process for securing, for example, an optical fiber to a substrate, element and/or ferrule, the optical fiber is not being stabilized, bonded, sealed, and the like, in a quick, reliable, inexpensive and highly automated manner. Accordingly, the manufacturing/production industry of optical fibers and/or devices has been unable to meet the demands to satisfy industry needs of same. As a result, optical fibers, and/or connectors utilizing same, are unnecessarily expensive due to the standard economic supply/demand theory.

Advantageously, I have discovered that a simple procedure may be used to stabilize, bond, and/or seal an optical fiber to an external element in a quick, reliable, inexpensive and highly automated manner. Accordingly, optical fiber, connector, and/or device production will be greatly increased due to this new category or class of techniques described herein.

In addition, I have discovered that the above techniques may be used for accurate and consistent production of high quality optical fibers, connectors, and/or devices that are secured to an external substrate for strength, support, and protection. I have realized that the optical fiber and/or fiber optic device is inserted in an external element that has a gap or hole of greater dimension than the optical fiber, to facilitate and/or permit the insertion of the optical fiber therein. In this connection, I have further realized that bonding materials are required to adhere the optical fiber within the gap, and/or to fill in the space differential therebetween.

I have, however, discovered that bonding materials are not required to be used to secure an optical fiber and/or fiber optic device to an external element. For example, I have determined that an optical fiber may be secured to a hole in a ferrule without necessitating the use of any bonding material such as an epoxy, adhesive, and the like.

In accordance with one embodiment of the invention, an apparatus includes at least one optical fiber, device and fiber optic device with a region, and a ferrule with a connection area or aperture. At least one of the region is expanded, and the aperture is contracted, for substantial securing of the region to the aperture of the ferrule.

In accordance with another embodiment of the invention, an apparatus includes at least one optical fiber, device and fiber optic device with a region, and a ferrule with a connection area or aperture. At least one of the region is contracted for substantial insertion into the aperture, and the connection area is expanded for substantial insertion of the region into the aperture.

Methods are also provided for performing the connections required in the above apparatus.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 11 shows the cylindrical tube of FIG. 10 covering the secured optical fiber in the process according to the second embodiment of the invention.

DESCRIPTION OF PREFERRED EMBODIMENT OF THE INVENTION

The present invention is used on, and provides accurate and reliable production and/or packaging of, optical fibers, devices and/or fiber optic devices (hereinafter "optical fiber") such as couplers, switches, wave-division multiplexers (WDM), filters, attenuators, polarizers, waveguides, fiber optic sensors, connectors, fiber optic connectors, fiber optic transmitters, fiber optic receivers, optical amplifiers, fiber optic amplifiers, and the like, that provide substantially similar optical responses, properties and/or indicators. These various fiber optic devices, such as the WDM, may be constructed of different materials such as glass, crystal, metal, plastic, ceramic and the like.

The present invention is used on, and provides accurate and reliable production and/or packaging of, optical fibers, devices and/or fiber optic devices for reinforcing, sealing, securing and/or connection of same to an external substrate, element, and/or ferrule (hereinafter "ferrule"), described above. One principal advantage of this procedure is that it allows the optical fiber, device and/or fiber optic device to be sealed and/or secured to a ferrule possibly without exposing same to damaging temperature extremes. This technique can quickly and inexpensively secure and/or hermetically secure and/or seal possibly temperature sensitive fiber optic devices in a highly automated manner.

Another principal advantage of this procedure is that it allows an optical fiber to be sealed or connected quickly, simply, reliably, and inexpensively. A principal use of this procedure could be to provide connectors and/or package devices for a manufacturer. This technique will also quickly and inexpensively seal, connect and/or package devices in a highly automated manner.

To illustrate the above techniques, I will conceptually demonstrate the attachment of a connector to the end of an optical fiber. The packaging of other or multiple optical fibers, devices, and/or fiber optic devices would be similar. The optical fiber in the example described below has only a single optical fiber, however, the process described herein may also be used for multiple optical fibers exiting opposite sides of a device. Further, the techniques described herein could also be applied to any device with at least a single optical fiber exiting therefrom.

The production and/or packaging of other optical fibers, devices and/or fiber optic devices would be similar (with the exception that some steps may be added and/or omitted based on the specific device being packaged and/or produced), including packaging and/or production of single optical fibers and/or devices.

Figure 1:
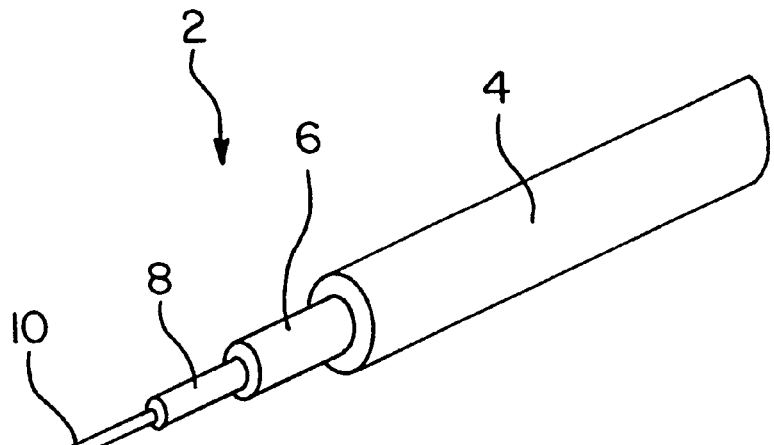
FIG. 1 shows a cabled optical fiber, properly stripped and ready for the attachment of a connector.

FIG. 1 shows a cabled optical fiber, properly stripped and ready for the attachment of a connector. The cabled optical fiber 2 is comprised of an outer nylon protective jacket 4, a Kevlar yarn strength member 6, a polymer tight buffer coating 8, and the optical fiber 10. Of course, other optical fiber structures can be used with the process of the present invention described herein. That is, the structure of the various coating used in connection with the optical fiber, device, and/or fiber optic device, does not affect the processes and resulting products described herein.

Figure 2:
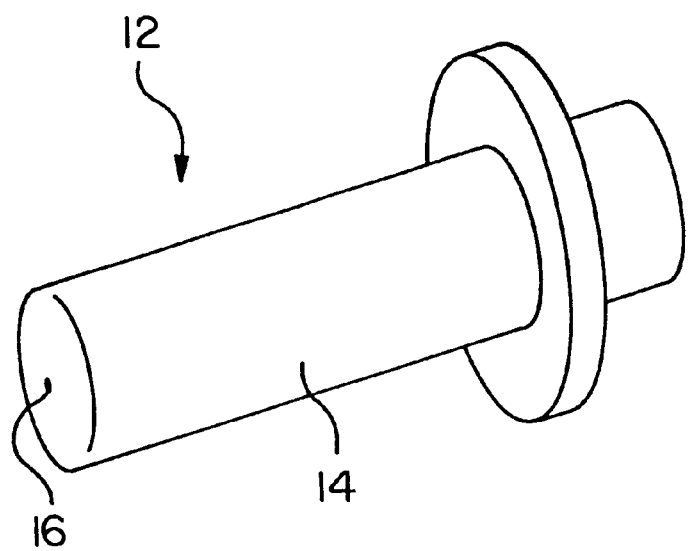
FIG. 2 shows a ferrule within which the optical fiber will be secured.

FIG. 2 shows a ferrule within which the optical fiber will be secured. The ferrule 12, which may be made of ceramic, stainless steel, polymer, glass, metal, metal alloy, or other suitable material, may be precision bored throughout its length, for example, exactly in its center, with a possibly circular hole 16 of a diameter that is advantageously only nominally larger, equal to, or slightly smaller, than the diameter of, for example, the optical fiber. The bore hole 16, shown in the center of the tip 14 on the left end of the ferrule 12, may include and/or contain and/or filled with, and/or partially filled with, and/or coated with, and/or partially coated with, some form of possibly compliant interface material (e.g., metal, polymer, alloy, and the like), or may be substantially free from any additional materials.

The specific configuration of the ferrule and bore hole are merely exemplary, and not to be used to limit the process and resulting product of the present invention. For example, instead of the ferrule configuration described in FIG. 2, a thin disc-like shape, box, or other shape may be utilized. Further, in some instances, an interface material, if used, might be pre-disposed on an edge surface at the junction of one or more materials to facilitate connection to an external element. Other compositions and/or structures and/or shapes of ferrule 12 may also be used.

Figure 3:
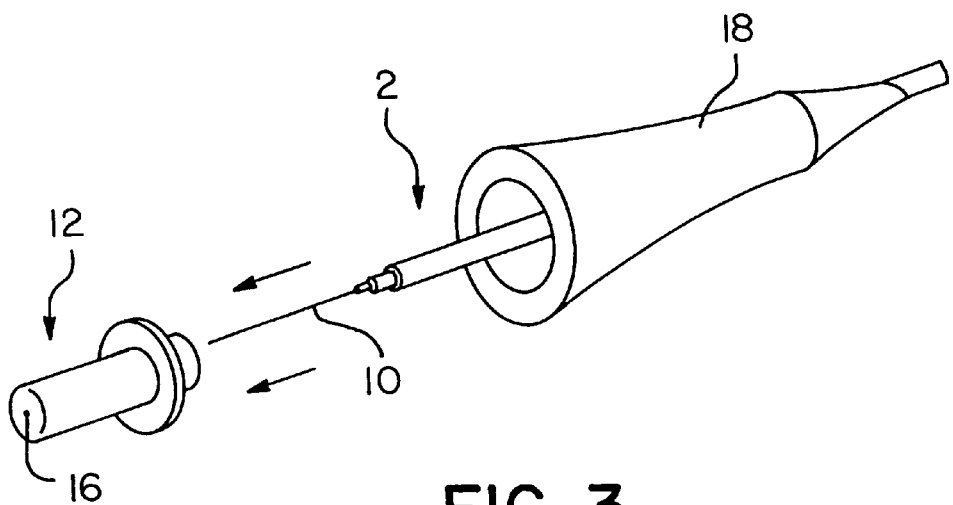
FIG. 3 shows that the ferrule is heated to a sufficient temperature to cause the bore hole to expand enough to allow the optical fiber to be easily inserted.

FIG. 3 shows that the ferrule 12 is expanded by application and/or removal of energy, for example, by heating it to a sufficient temperature, to cause the bore hole 16 to expand enough to allow the optical fiber 10, stripped of protective sheathing in cabled optical fiber 2, to be easily inserted. The application and/or removal of energy may possibly soften and/or partially melt and/or melt some and/or all of the interface material that may be present within the bore hole. The optical fiber 10, which has been properly prepared with any necessary additional connector components (such as boot 18), is inserted through, into and/or onto, the expanded bore hole 16 of the heated ferrule 12, possibly displacing some and/or most and/or substantially all and/or a portion of the interface material, if present, within the bore hole. As described above, other configurations of the external element may dictate whether the optical fiber is inserted within and/or into and/or onto the external element and/or ferrule. Further, other compositions and/or structures and/or shapes of boot 18 and/or cabled optical fiber 2 may also be used.

Figure 4:
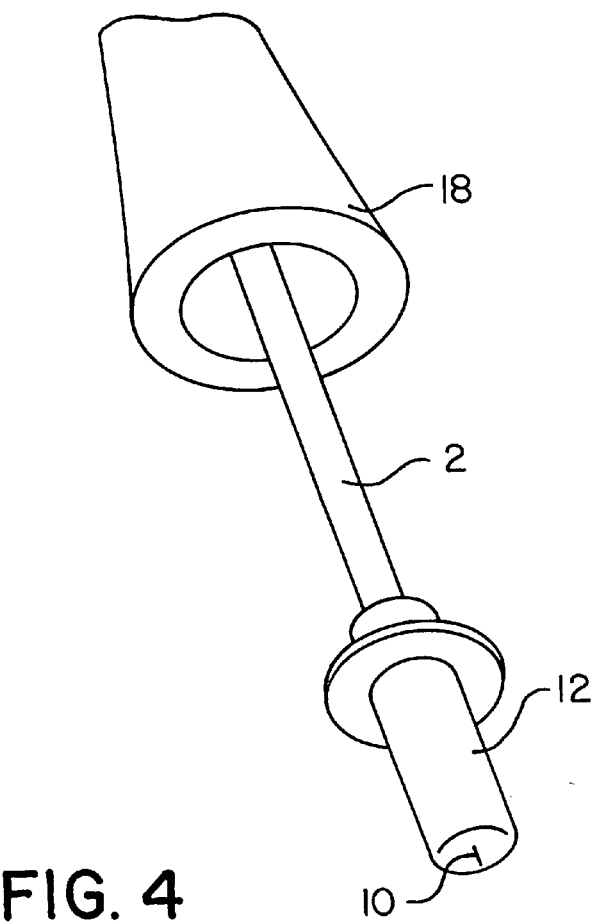
FIG. 4 shows that the optical fiber is now in place within the ferrule.

FIG. 4 shows that the optical fiber 10 is now in place within the ferrule 12. The end of optical fiber 10 may be substantially flush with the end of the bore hole of ferrule 12, or optical fiber 10 may protrude from the bore hole of ferrule 12. In the event the optical fiber 10 protrudes from the bore hole of ferrule 12, if desired, the end of optical fiber 10 can be shortened and/or made substantially flush with the bore hole by cleaving, breaking, cutting, and the like. As the ferrule 12 is caused to contract, for example, by cooling it, the bore hole contracts, ensuring that the optical fiber 10 is securely attached without substantial stress, and that a tight seal is maintained. As will be discussed below, other methods of inserting the optical fiber 10 into hole 16 of ferrule 12 may also be used. All of these methods take advantage of natural properties of the optical fiber and/or ferrule in securing the optical fiber to the ferrule without requiring some form of adhesive or significant interface material.

Figure 5:
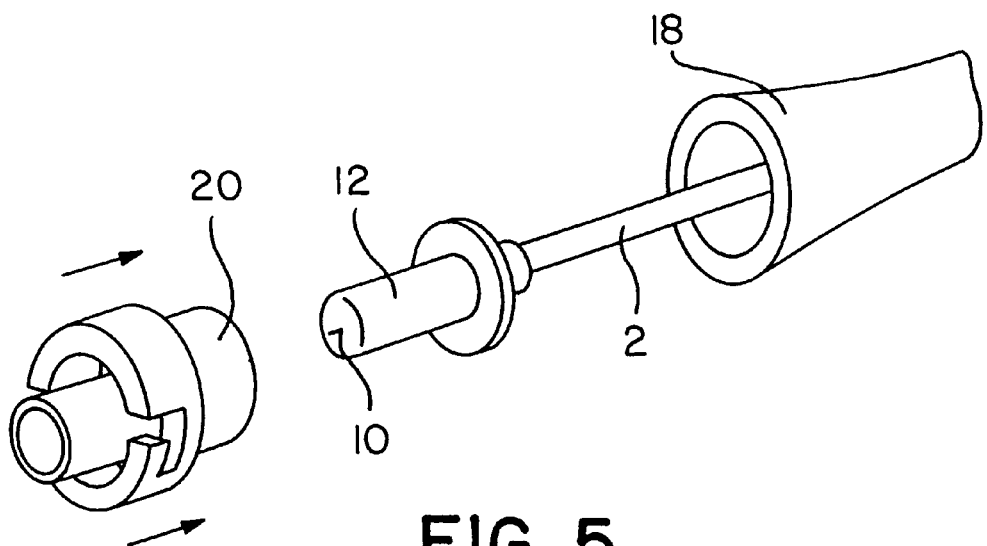
FIG. 5 shows that optical fiber is now securely attached within the ferrule.

FIG. 5 shows that the optical fiber 10 is now securely attached within the ferrule 12. Boot 18 and cabled optical fiber 2 are illustrated prior to connection of boot 18 to connector body 20. The connector body 20, to the left of the ferrule 12 is slid over the ferrule assembly 12. Other types of connectors can also be used, such as those illustrated in the U.S. patents incorporated by reference previously. Further, additional methods of connecting and/or securing the connector body 20 to boot 18 and/or cabled optical fiber 2 may also be used, such as welding, gluing, crimping and the like.

Figure 6:
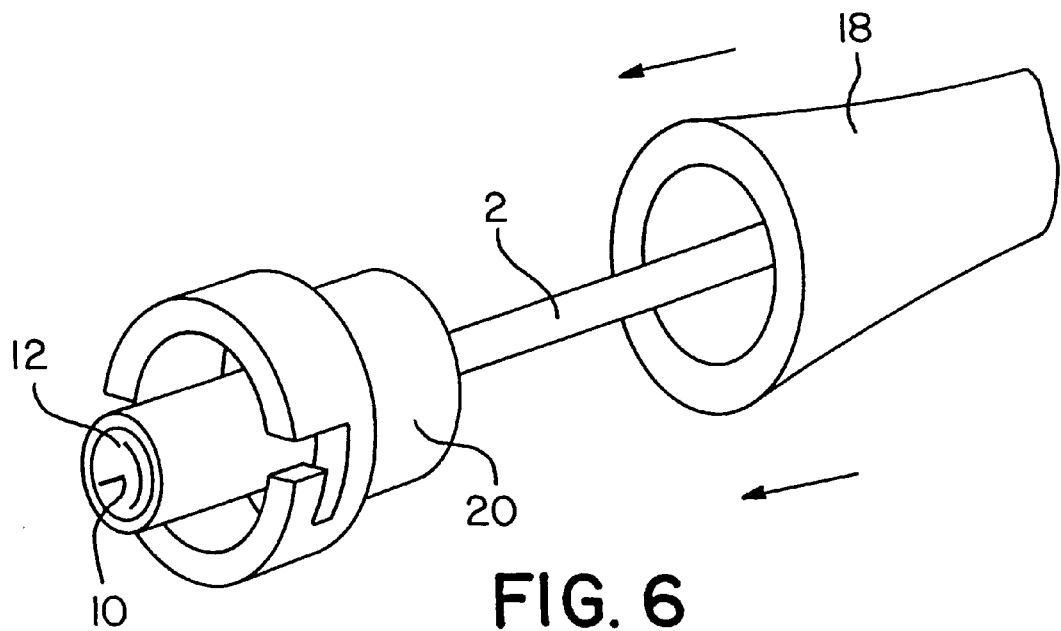
FIG. 6 shows that the connector body is now in place over the ferrule assembly.
Figure 7:
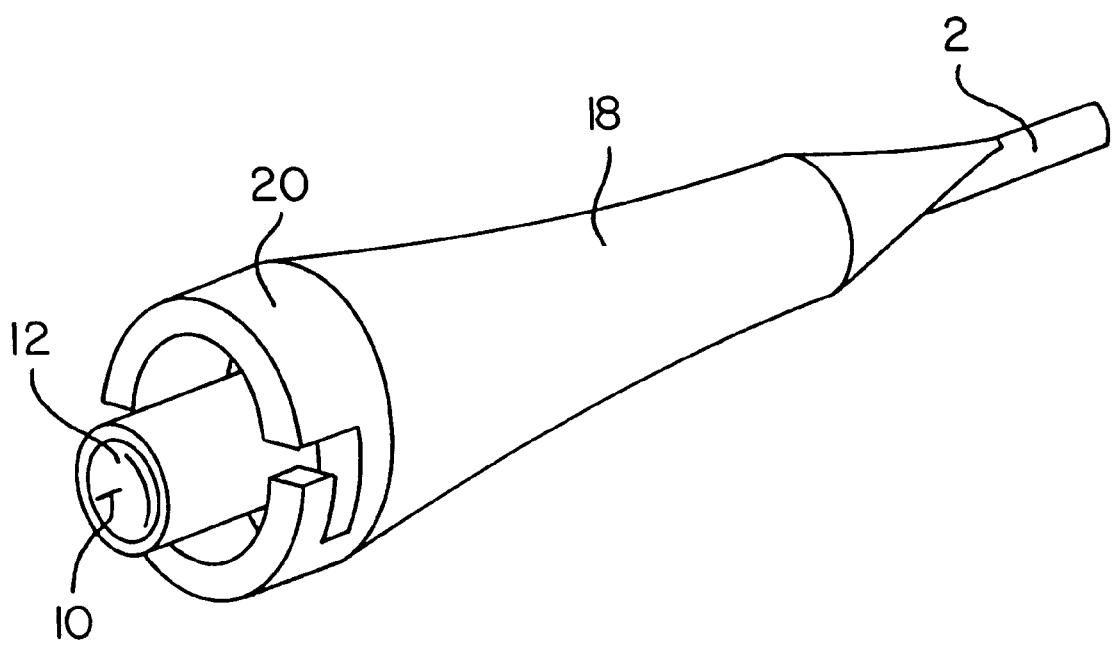
FIG. 7 shows that the connector is now securely attached to the end of the cabled optical fiber and is ready to be polished and used.

FIG. 6 shows that the connector body 20 is now in place over the ferrule assembly 12. The connector body 20 is attached to the protective sheathing of cabled optical fiber 2, and the boot 18 is slid over and attached to the connector body 20. FIG. 7 shows that the connector 20 is now securely attached to boot 18, and the sheathed section of cabled optical fiber 2, with the optical fiber 10 exposed therefrom. The end of the optical fiber 10 and/or ferrule 12 is now ready to be polished and used.

Boot 18 is comprised of any suitable compliant material, for example, rubber, polymer, and the like, to provide stress relief on the connector. Other compositions and/or structures and/or shapes of boot 18 may also be used. Similarly, other additional layers may be placed, coated, sprayed, and the like, on the connector 20 and/or boot 18.

Alternatively, the junctions between the connector 20 and boot 18 may be tightly welded and sealed by the localized application of energy (or other application of energy such as heating the entire structure), such as by a laser or ultrasonic transducer, to prevent damage to the optical fiber disposed therein.

Figure 8:
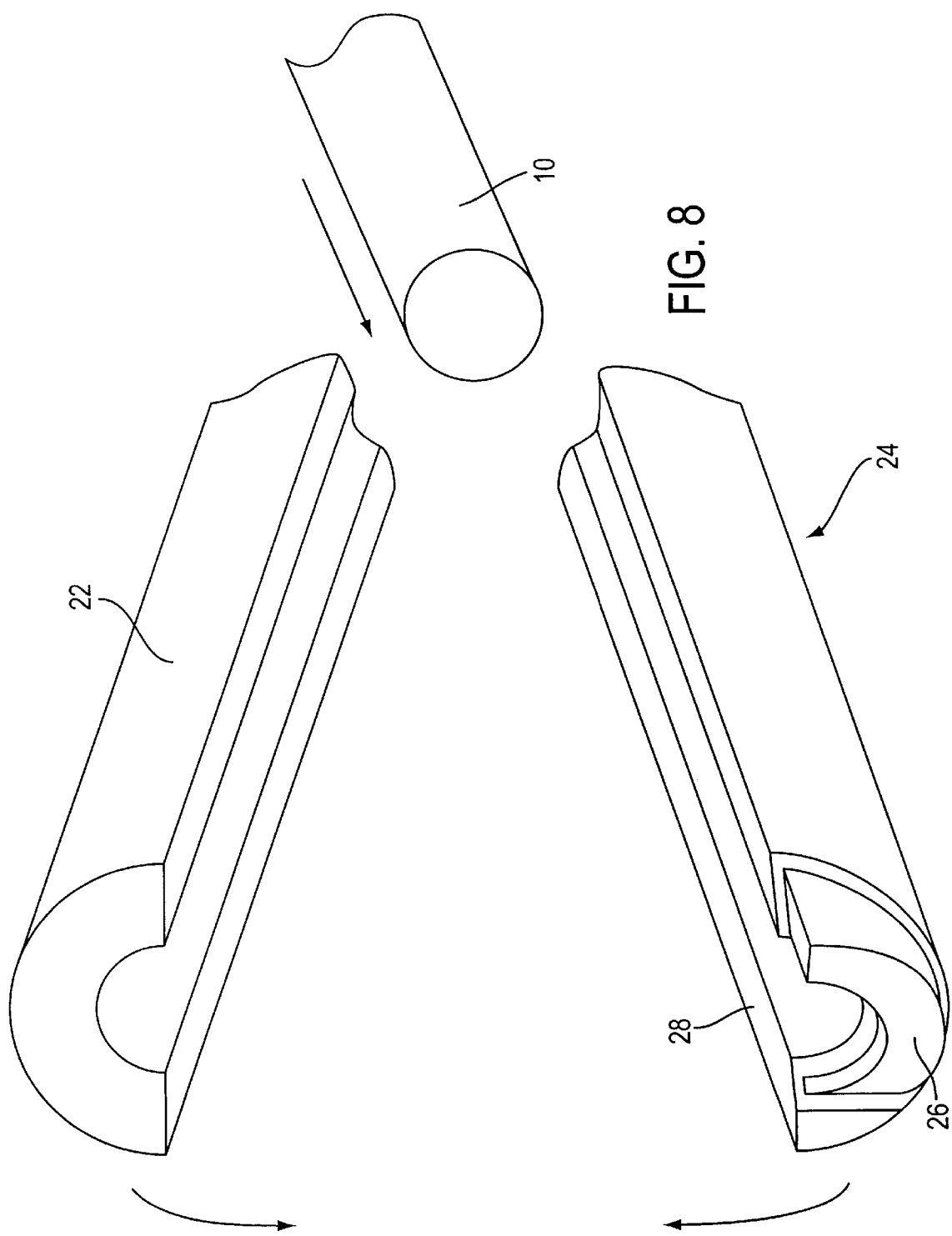
FIG. 8 shows a isometric view of semi-cylindrical cusps used in the process according to a second embodiment of the invention.

FIG. 8 shows a isometric view of semi-cylindrical cusps used in the process according to a second embodiment of the invention. Cusps 22, 24 may be comprised of a shell 26 of fused silica, with a similar composition as that of the optical fiber, and with all surfaces optionally coated with a thin layer of, for example, pure aluminum 28. Other compositions and/or structures and/or shapes of cusps 22, 24 may also be used. For example, the aluminum layer 28 may be omitted, and the cusps 22, 24 may be, for example, of a material that is able to provide some form of compressive force on optical fiber 10 disposed therein when the cusps 22, 24 are pressed together.

Figure 9:
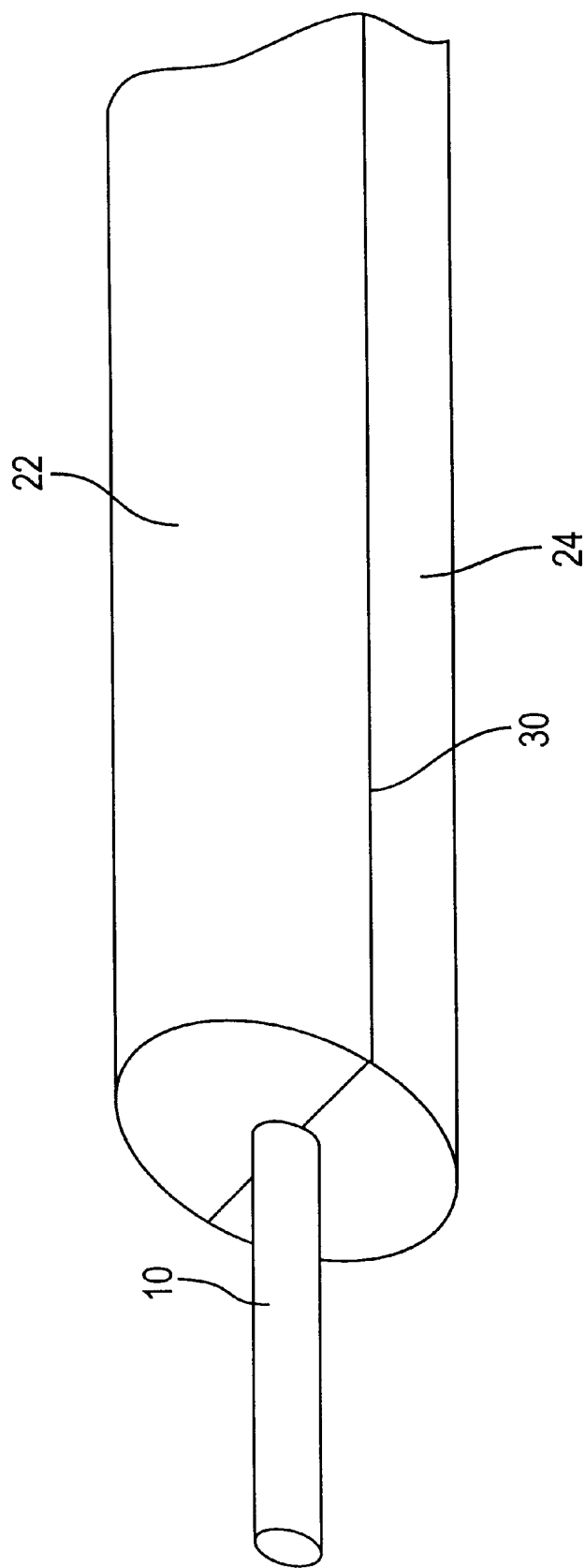
FIG. 9 shows the semi-cylindrical cusps of FIG. 8 pressed together causing the joints between the cusps.

FIG. 9 shows the semi-cylindrical cusps of FIG. 8 pressed together and surrounding and/or securing optical fiber 10, causing and/or resulting in joint 30 between the cusps 22, 24. Optical fiber 10 protrudes or emanates from cusps 22, 24; however, the optical fiber 10 may alternatively be flush with, or disposed within, cusps 22, 24. The pressed cusps 22, 24, each having a semi-circular cavity dimensioned to be substantially equal to, or slightly less than, or slightly greater than the dimension of the optical fiber, are positioned over optical fiber 10 and compressed and/or squeezed together. This may cause the material interface, if present, to deform and/or compress and/or secure the optical fiber 10 and possibly to seal and/or secure it to the cusps 22, 24.

The joint 30 is also thereby possibly compressed. Joint 30 and/or cusps 22, 24 and/or any interface material present, may optionally be welded and/or sealed by the localized or non-localized application of energy, such as by heating, a laser or ultrasonic transducer. The localized application of energy that may be used to seal joint 30 advantageously prevents damage to the device where, for example, the device is highly temperature sensitive and heating of the total device to promote sealing is impossible. Alternatively, the entire structure may be heated to promote, if desired, sealing and/or welding. Of course, cusps 22, 24 need not be secured to and/or in contact with each other and/or to or with the optical fiber 10 at this stage.

Figure 10:
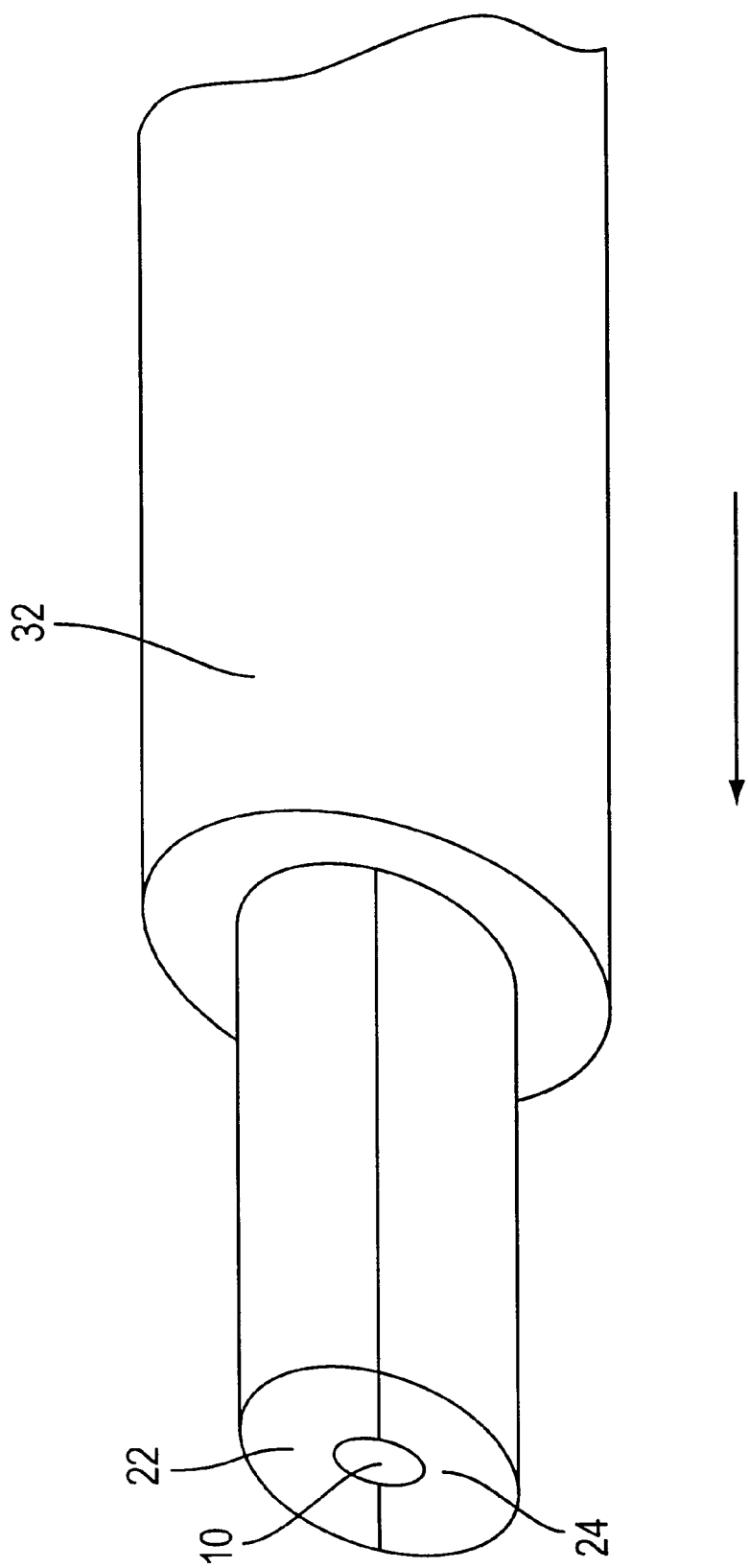
FIG. 10 shows a cylindrical tube being slid over the cusps illustrated in FIG. 9.

FIG. 10 shows a cylindrical tube 32 being slid over the cusps 22, 24 illustrated in FIG. 9. Cylindrical tube 32 is dimensioned to be substantially equal to, slightly larger, and/or slightly smaller than the outside diameter formed from cusps 22, 24 positioned together. Cylindrical tube 32 may be expanded, as described above in connection with the expansion of the ferrule, to cause its hole or cavity to expand enough to allow cusps 22, 24 and optical fiber 10 to be easily inserted therein. Cylindrical tube 32 is then caused to contract, as described above in connection with the contraction of the ferrule, exerting a compressive and/or sealing force on the cusps 22, 24 and/or optical fiber 10, and possibly any interface material, if present, between the cusps 22, 24 and cylinder 32, and/or between cusps 22, 24 and optical fiber 10, and/or between cusp 22 and cusp 24. The cylindrical tube 32 and/or cusps 22, 24 and/or optical fiber 10 may then be optionally sealed and/or hermetically sealed resulting in a sealed and/or partially sealed device.

As described above, other configurations of the external elements can be used and may dictate whether the optical fiber is inserted within and/or into the cusps and/or an external element(s) and/or assembly and/or a ferrule. For example, the cusps and cylinder configuration described above can be pre-assembled, and the optical fiber inserted therein after the assembly, and/or cylinder and/or cusps are expanded as described above, possibly displacing some portion of the interface material, if present. The assembly and/or cylinder and/or cusps can then be contracted, as described above in connection with the ferrule, to secure the optical fiber to the assembly.

As the cylinder and/or cusps contract, the bore hole therein contracts, ensuring that the optical fiber may be securely attached without substantial stress, and that a tight seal may be maintained. Other methods of inserting the optical fiber into the hole between the cusps, and/or inserting the cusps and/or optical fiber into the cylinder may also be used. All of these methods take advantage of natural properties of the optical fiber and/or cusps and/or cylinder in securing the optical fiber to the assembly without requiring some form of adhesive or significant interface material.

FIG. 11 shows the completed assembly of FIG. 10 with cylindrical tube 32 covering optical fiber 10 and cusps 22, 24 according to the second embodiment of the invention. The exterior of cusps 22, 24 and/or cylinder 32, and/or optical fiber 10 (or other fiber optic device) may be comprised of any shape so long as the optical fiber (or fiber optic device) can be stabilized by the interior, and so long that the exterior of the cusps and/or optical fiber may be subjected to a compressive force (either, for example, by the cusps and/or optical fiber expanding and/or the exterior cylinder and/or the cusps, and the like, contracting). For example, either and/or both of cusps 22, 24 and cylinder 32 may be shaped in a disk configuration, instead of a cylindrical configuration.

In addition, while the above example is illustrative of cusps 22, 24 having an optional layer of, for example, metal/aluminum, cusps 22, 24 are not required to have such a layer. Alternatively, cusps 22, 24 and/or cylinder 32 and/or optical fiber 10 may have one or more exterior layers.

While the above steps or processes have described a technique for securing and/or sealing and/or hermetically sealing an optical fiber to an external substrate, the above processes may be used on any optical fiber, device and/or fiber optical device providing or requiring securing and/or bonding of an end(s) and/or portion and/or region thereof to an external substrate for support, strength and/or protection. Further, the above process may be modified to suit particular connector and/or packaging needs where, for example, only one or multiple layers of connector and/or packaging are required and/or different shapes and/or compositions of the connectors and/or packaging are required.

The above process illustrates various methods of taking advantage of the simplified and inexpensive securing and/or bonding process of the present invention. Thus, various other connection and/or packaging techniques may also be used to capitalize on, or use, the above securing and/or bonding process. Additional materials may also be used to seal the end(s) and/or portion and/or region of the optical fiber, device, and/or fiber optic device as well.

The above structure optionally allows the optical fiber, device, and/or fiber optic device to undergo or experience various environmental changes in conditions, while still having a portion thereof, or its entirety, secured, sealed and/or hermetically sealed. That is, the interplay of alternating layers of material facilitates the securing, sealing and/or hermetically sealing of a portion of the optical fiber, device and/or fiber optic device.

While the above steps or processes have described a technique for securing and/or sealing and/or hermetically sealing an optical fiber to an external substrate such as a ferrule and/or cusps, the above processes may be used on any optical fiber, device and/or fiber optical device providing or requiring securing of a portion and/or region and/or an end(s) thereof to an external substrate for support, strength and/or protection. Further, the above process may be modified to suit particular packaging needs where, for example, only one layer of packaging or multiple layers of packaging are required or where different shapes and/or structures and/or compositions of packaging are required.

The ferrule and/or cusps described herein may be modified in numerous ways to facilitate and/or accomplish the securing process described herein. For example, the ferrule may be modified so that the aperture or bore does not completely penetrate therethrough. In this instance, the bore, cavity and/or crater is used to secure to a portion of an optical fiber, fiber optic device and/or device to the crater of the ferrule, which, for example, may later be bored or be used to reflect signals and/or light therefrom. Thus, a ferrule may be used with, for example, a small depression, so long as the optical fiber may be connected thereto via compression of the ferrule material, with the possible aid of an interface material. For example, a gradient index (GRIN) lens used as and/or embedded in and/or connected to, the ferrule, may be secured to the end of the optical fiber as described herein. In addition, the GRIN lens may be used instead of the ferrule, and a depression and/or crater can be used for connection to the optical fiber as described above.

The ferrule may also be used to secure two or more fibers simultaneously using the same and/or different apertures and/or depressions, and the like. The ferrule may further be used to secure and/or connect and/or optically connect the ends of two or more optical fibers to each other, directly or indirectly via, for example, a GRIN lens, for use, for example, as a temporary and/or permanent and/or semi-permanent splice. The ferrule described herein may also be considered as any structure that may utilize the principles and/or methods described herein. For example, the ferrule described herein includes and/or encompasses a fiber optic device package and/or housing which, for example, is to be connected to an optical fiber, fiber optic device, and the like. In this example, the optical fiber may be secured to the fiber optic package in accordance with the procedures and/or substances and/or materials described herein.

The optional interface material may be composed of pure aluminum, other metals or other compliant materials that act as a strain relief on the fiber optic device. For example, gold, aluminum alloys, gold alloys, and the like, may also be used as the complaint and/or securing material. Other ductile and/or malleable and/or compliant materials may also be used. For example, any soft glass-like material such as sealing glass may also be used.

In addition, the optional interface material may be incidentally heated, or other more direct methods of heating and/or softening the interface material may be used. For example, various standard substances may be applied to the interface material for softening. Of course, the interface material need only be softened or soft to the point that it is softer that the fiber optic device being inserted thereon or therethrough. Thus, if the interface material is in a naturally and sufficiently soft state, no action or step to soften the securing material will be necessary. As discussed above, the hole in the ferrule need not be completely filled with the interface material to effectively secure the fiber optic device to the ferrule.

The interface material may be used to apply a compressive force on the optical fiber and/or fiber optic device and/or ferrule, and/or cusps, and/or external element(s). Additional details of the interface material and its possible uses are disclosed in copending patent application Ser. No. 08/880,037 entitled "APPARATUS FOR, AND METHOD OF, FORMING A LOW STRESS TIGHT FIT OF AN OPTICAL FIBER TO AN EXTERNAL ELEMENT" to the same applicant, filed on Jun. 20, 1997 (attorney docket 2986-004A), incorporated herein by reference.

Advantageously, the present invention does not require the use of a separate interface material when securing the fiber optic device to, for example, the ferrule (although an interface material may also be used). For instance, as described in detail above, the ferrule having an aperture may be heated or applied energy/substance (e.g., locally at the aperture, the entire ferrule) to thereby expand the ferrule and the aperture therein. The optical fiber, which is dimensioned to be substantially equal to, slightly larger, or slightly smaller than the aperture of the ferrule prior to heating, can then be inserted in the expanded ferrule aperture. Thereafter, the energy is removed from the ferrule which then returns to its original state, thereby the aperture contracting or shrink fitting around the optical fiber.

An alternative method of expanding the ferrule is to utilize a ferrule material with a negative coefficient of thermal expansion, such as a glass ceramic-like material. In this alternative, the ferrule is, for example, cooled and thereby expanded including the hole disposed therein. The optical fiber may then be inserted in the expanded hole. The ferrule may then be returned to room temperature, heated and/or the cooling force removed, to return it to its previous state, and thereby exerting a compressive force on the optical fiber. Of course, other types of ferrule materials, and/or other methods of expanding and/or contracting the ferrule hole and/or the optical fiber and/or any interface material, are considered within the scope of the present apparatus and method of securing a fiber optic device to an external substrate. For example, a piezo-electric like material may be used for the ferrule.

Another alternative is to dimension, and/or expand, and/or contract, the ferrule hole and/or the optical fiber and/or any interface material for the ferrule to receive the optical fiber therethrough. A continuous contracting force may then be exerted on, and/or subjected to, the ferrule to secure the optical fiber to the ferrule. The continuous contracting force may be, for example, subjecting the ferrule to a cooling force and/or placing the ferrule in a cool intended operating environment, and the like. Similar reasoning applies when the ferrule is constructed of a material with a negative coefficient of expansion. Thus, a continuous expanding force may be exerted on, and/or subjected to, the optical fiber to secure the optical fiber to the ferrule (a pizeo-electric material is well suited for this purpose). This has the added advantage of providing a potentially or user selectable temporary connection between the optical fiber and the ferrule until the ferrule and/or the optical fiber are removed from the contracting and/or expanding force, respectively, and vice versa.

Advantageously, the present invention also does not require the ferrule to be expanded to connect the optical fiber thereto. For example, the optical fiber may be cooled or applied a contracting energy/substance (e.g., locally at the connection area, the entire optical fiber) to thereby contract the optical fiber. The optical fiber, which may be dimensioned to be substantially equal to, slightly larger, or larger, (and if a compliant interface layer is used between the optical fiber and the ferrule as discussed above, slightly smaller), than the aperture of the ferrule prior to being contracted/shrunken, can then be inserted in the ferrule aperture. Thereafter, the energy/substance is removed, withdrawn or neutralized from the optical fiber which then substantially returns to its original expanded state, thereby the optical fiber being expand-fitted around the ferrule. One exemplary substance that can be used to contract the optical fiber device is liquid nitrogen.

Of course, as described above, both the ferrule may be expanded and the optical fiber may be contracted, sequentially, simultaneously, continuously, and the like, to further enhance the benefits of the present apparatus and method of securing a fiber optic device to an external substrate. Further, the optical fiber need not be pre-contracted and/or the ferrule need not be pre-expanded to accomplish the securing process described herein. That is, the ferrule and optical fiber can be pre-dimensioned such that the optical fiber may be inserted in the ferrule, and then an expanding force on the optical fiber and/or a contracting force on the ferrule may be exerted.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus, comprising:

at least one optical fiber device having a region;

a connection element including a connection area;

wherein at least one of the region is contracted, and the connection area is expanded for inserting of the region at least one of into and on the connection area.

2. A apparatus of claim 1, wherein said connection element is substantially cylindrically shaped.

3. A apparatus of claim 1, wherein said connection element is substantially disc shaped.

4. An apparatus of claim 1 wherein the optical fiber device comprises at least one of a wavelength division multiplexer, a wideband fiber optic coupler, a coupler, a switch, a filter, an attenuator, a waveguide, a fiber optic sensor, a sensor, a fiber optic coupler, an optical fiber and a polarizer.

5. An apparatus of claim 1 wherein the apparatus is used for one of a temporary, semi-permanent and permanent connection.

6. An apparatus of claim 1 wherein the connection element comprises a lens.

7. An apparatus of claim 1 wherein the connection element is used as an optical splice.

8. An apparatus of claim 1, wherein the region and the connection area are dimensioned such that the region is insertable in the connection area.

9. An apparatus of claim 1, wherein the region and the connection area are dimensioned to be of a substantially same size.

10. An apparatus of claim 1, wherein the region and the connection area are dimensioned to be of a different size.

11. An apparatus, comprising:
   at least one optical fiber device having a region;
   a connection element including a connection area;
   wherein at least one of the region is contracted, and the connection area is expanded for inserting of the region at least one of into and on the connection area, using an optional securing material therebetween.

12. A apparatus of claim 11, wherein said connection element is substantially cylindrically shaped.

13. A apparatus of claim 11, wherein said connection element is substantially disc shaped.

14. An apparatus of claim 11 wherein the optical fiber device comprises at least one of a wavelength division multiplexer, a wideband fiber optic coupler, a coupler, a switch, a filter, an attenuator, a waveguide, a fiber optic sensor, a sensor, a fiber optic coupler, an optical fiber and a polarizer.

15. An apparatus of claim 11 wherein the apparatus is used for one of a temporary, semi-permanent and permanent connection.

16. An apparatus of claim 11 wherein the connection element comprises a lens.

17. An apparatus of claim 11 wherein the connection element is used as an optical splice.

18. An apparatus of claim 11, wherein the region and the connection area are dimensioned such that the region is insertable in the connection area.

19. An apparatus of claim 11, wherein the region and the connection area are dimensioned to be of a substantially same size.

20. An apparatus of claim 11, wherein the region and the connection area are dimensioned to be of a different size.

* * * * *

UNITED STATES PATENT AND TRADEMARK OFFICE
CERTIFICATE OF CORRECTION

PATENT NO. : 6,074,101
DATED : June 13, 2000
INVENTOR(S) : Cary Bloom

It is certified that error appears in the above-identified patent and that said Letters Patent is hereby corrected as shown below:

Title Page [63] line 4-5 change "08/880,033" to --08/880,073-- and change "5,959,296" to --6,000,858--.

Signed and Sealed this

Twenty-second Day of May, 2001

Attest:

NICHOLAS P. GODICI

*Attesting Officer*    *Acting Director of the United States Patent and Trademark Office*